(12) United States Patent
Sugimoto et al.

(10) Patent No.: US 11,631,853 B2
(45) Date of Patent: Apr. 18, 2023

(54) BATTERY

(71) Applicant: Panasonic Intellectual Property Management Co., Ltd., Osaka (JP)

(72) Inventors: Yuta Sugimoto, Hyogo (JP); Izuru Sasaki, Kyoto (JP); Tatsuya Oshima, Osaka (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 379 days.

(21) Appl. No.: 16/931,092

(22) Filed: Jul. 16, 2020

(65) Prior Publication Data

US 2020/0350625 A1    Nov. 5, 2020

Related U.S. Application Data

(63) Continuation of application No. PCT/JP2018/045585, filed on Dec. 12, 2018.

(30) Foreign Application Priority Data

Jan. 26, 2018   (JP) ............................ JP2018-011526
Jan. 26, 2018   (JP) ............................ JP2018-011527
Sep. 18, 2018   (JP) ............................ JP2018-173450

(51) Int. Cl.
*H01M 4/587*   (2010.01)
*H01M 4/133*   (2010.01)
(Continued)

(52) U.S. Cl.
CPC ........... *H01M 4/587* (2013.01); *H01M 4/133* (2013.01); *H01M 4/62* (2013.01); *H01M 10/052* (2013.01);
(Continued)

(58) Field of Classification Search
None
See application file for complete search history.

(56) References Cited

U.S. PATENT DOCUMENTS

2011/0076570 A1*   3/2011   Hama ............... H01M 10/0562
                                            429/306
2013/0164631 A1*   6/2013   Ohtomo ............ H01M 10/0562
                                            429/319
(Continued)

FOREIGN PATENT DOCUMENTS

JP    2001-052733    2/2001
JP    2006-244734    9/2006
(Continued)

OTHER PUBLICATIONS

International Search Report of PCT application No. PCT/JP2018/045585 dated Mar. 19, 2019.
(Continued)

*Primary Examiner* — Laura Weiner
(74) *Attorney, Agent, or Firm* — McDermott Will & Emery LLP

(57) ABSTRACT

Provided is a battery in which the internal resistance is further decreased. The present disclosure provides a battery, comprising a positive electrode, a negative electrode, and an electrolyte layer provided between the positive electrode and the negative electrode. The electrolyte layer includes a first solid electrolyte material. The first solid electrolyte material includes Li, M, and X, and does not include sulfur. M is at least one selected from the group consisting of metalloid elements and metal elements other than Li. X is at least one selected from the group consisting of Cl, Br, and I. The negative electrode includes a negative electrode active material and a sulfide solid electrolyte.

6 Claims, 4 Drawing Sheets

(51) Int. Cl.
*H01M 10/052* (2010.01)
*H01M 10/0562* (2010.01)
*H01M 4/62* (2006.01)
*H01M 50/431* (2021.01)
*H01M 50/449* (2021.01)
*H01M 50/46* (2021.01)
*H01M 4/02* (2006.01)

(52) U.S. Cl.
CPC ..... *H01M 10/0562* (2013.01); *H01M 50/431* (2021.01); *H01M 50/449* (2021.01); *H01M 50/46* (2021.01); *H01M 2004/027* (2013.01); *H01M 2004/028* (2013.01); *H01M 2300/008* (2013.01); *H01M 2300/0094* (2013.01)

(56) References Cited

U.S. PATENT DOCUMENTS

| | | | |
|---|---|---|---|
| 2013/0177821 A1* | 7/2013 | Tsuchida | H01M 10/052 429/323 |
| 2016/0204467 A1* | 7/2016 | Nogami | H01M 10/0562 429/322 |
| 2016/0211519 A1* | 7/2016 | Uchiyama | H01M 10/0562 |
| 2017/0104245 A1* | 4/2017 | Kodama | H01M 10/0562 |
| 2019/0088995 A1 | 3/2019 | Asano et al. | |

FOREIGN PATENT DOCUMENTS

| | | |
|---|---|---|
| JP | 2014-241282 | 12/2014 |
| JP | 2015-185237 A | 10/2015 |
| WO | 2018/025582 | 2/2018 |

OTHER PUBLICATIONS

Andreas Bohnsack et al., "The Bromides Li3MBr6 (M=Sm-Lu, Y): Synthesis, Crystal Structure, and Ionic Mobility", Journal of Inorganic and General Chemistry, Sep. 1997, vol. 623/Issue 9, pp. 1352-1356.

Andreas Bohnsack et al., "Ternary Chlorides of the Rare-Earth Elements with Lithium, Li3MCl6 (M=Tb-Lu, Y, Sc): Synthesis, Crystal Structures, and Ionic Motion", Journal of Inorganic and General Chemistry, Jul. 1997, vol. 623/Issue 7, pp. 1067-1073.

Indian Examination Report dated Jul. 8, 2022 for the related Indian Patent Application No. 202047031493.

* cited by examiner

C.E. means Comparative Example.
I.E. means Inventive Example.

BATTERY

BACKGROUND

1. Technical Field

The present disclosure relates to a battery.

2. Description of the Related Art

Patent Literature 1 discloses an all-solid battery using a halide including indium as a solid electrolyte.

CITATION LIST

Patent Literature

Patent Literature 1: Japanese Patent Application Publication No. 2006-244734

SUMMARY

In the prior art, further decrease in internal resistance of a battery is desired.

The battery according to one aspect of the present disclosure comprises:

a positive electrode;
a negative electrode; and
an electrolyte layer provided between the positive electrode and the negative electrode,
wherein
the electrolyte layer includes a first solid electrolyte material;
the first solid electrolyte material includes Li, M, and X, and does not include sulfur;
M is at least one selected from the group consisting of metalloid elements and metal elements other than Li,
X is at least one selected from the group consisting of Cl, Br, and I; and
the negative electrode includes a negative electrode active material and a sulfide solid electrolyte.

According to the present disclosure, internal resistance of the battery can be decreased.

DETAILED DESCRIPTION OF THE EMBODIMENTS

Hereinafter, embodiments of the present disclosure will be described with reference to the drawings.

First Embodiment

Figure 1:
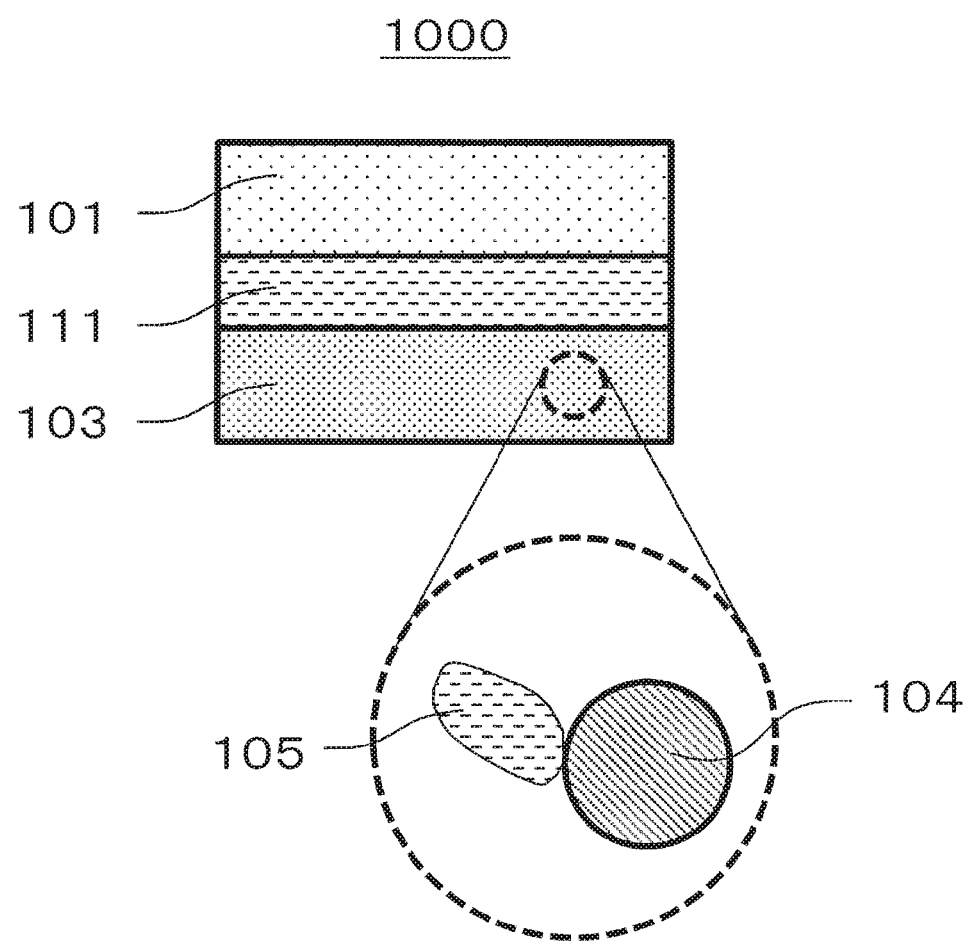
FIG. 1 shows a cross-sectional view of a battery 1000 in a first embodiment.

FIG. 1 shows a cross-sectional view of a battery 1000 in the first embodiment.

The battery 1000 in the first embodiment comprises a positive electrode 101, a negative electrode 103, and an electrolyte layer 111.

The electrolyte layer 111 is provided between the positive electrode 101 and the negative electrode 103.

The electrolyte layer 111 includes a first solid electrolyte material.

The first solid electrolyte material is a material represented by the following composition formula (1).

$$Li_\alpha M_\beta X_\gamma \quad \text{Formula (1)}$$

where $\alpha$, $\beta$, and $\gamma$ are each independently a value greater than 0.

M includes at least one selected from the group consisting of metalloid elements and metal elements other than Li.

X is at least one selected from the group consisting of Cl, Br, and I.

The negative electrode 103 includes a negative electrode active material and a sulfide solid electrolyte.

According to the above configuration, internal resistance of the battery can be decreased. In other words, interface resistance between the negative electrode active material and the solid electrolyte in the negative electrode can be decreased.

By using the halide solid electrolyte (namely, the first solid electrolyte material), a battery having high lithium ion conductivity can be realized. However, the halide solid electrolyte is reduced at an electric potential with regard to Li of not more than 1.5 V. Here, in the battery of the first embodiment, the periphery of the negative electrode active material is covered with the sulfide solid electrolyte using an electrochemically stable sulfide solid electrolyte. Thereby, contact of the halide solid electrolyte and the negative electrode active material can be suppressed. For this reason, the reduction of the halide solid electrolyte can be suppressed. As a result, the charge/discharge characteristic of the battery can be improved.

The term "metalloid elements" is at least one selected from the group consisting of B, Si, Ge, As, Sb, and Te.

The term "metal elements" used in the present specification includes (i) all elements included in Group 1 to Group 12 of the Periodic Table (except for hydrogen), and
(ii) all elements included in Group 13 to Group 16 of the Periodic Table (except for B, Si, Ge, As, Sb, Te, C, N, P, O, S, and Se).

In other words, each of the metal elements becomes a cation, if each of the metal elements forms an inorganic compound with a halogen compound.

In the composition formula (1), M may include Y (namely, yttrium).

In other words, the first solid electrolyte material may include Y as the metal element M.

According to the above configuration, the ionic conductivity of the first solid electrolyte material can be further improved. Thereby, the charge/discharge efficiency of the battery can be further improved.

The first solid electrolyte material including Y may be, for example, a compound represented by a composition formula $Li_a Me_b Y_c X_6$ (a+mb+3c=6 and c>0 are satisfied) (Me: at least one of metalloid elements and metal elements other than Li and Y) (m: valence of Me).

As Me, any of Mg, Ca, Sr, Ba, Zn, Sc, Al, Ga, Bi, Zr, Hf, Ti, Sn, Ta, and Nb, or a mixture thereof may be used.

According to the above configuration, the ionic conductivity of the first solid electrolyte material can be further improved.

The first solid electrolyte material may be $Li_{2.5}Y_{0.5}Zr_{0.5}Cl_6$, $Li_3YCl_6$, or $Li_3YBr_6$.

According to the above configuration, the ionic conductivity of the first solid electrolyte material can be further improved.

The first solid electrolyte material may be a material represented by the following composition formula (A1).

$$Li_{6-3d}Y_dX_6 \qquad \text{Formula (A1)}$$

where, in the composition formula (A1), X is two or more elements selected from the group consisting of Cl, Br, and I.

In addition, in the composition formula (A1), 0<d<2 is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A2).

$$Li_3YX_6 \qquad \text{Formula (A2)}$$

where, in the composition formula (A2), X is two or more elements selected from the group consisting of Cl, Br, and I. In other words, in the composition formula (A1), d=1 may be satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A3).

$$Li_{3-3\delta}Y_{1+\delta}Cl_6 \qquad \text{Formula (A3)}$$

where, in the composition formula (A3), $0<\delta\leq0.15$ is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A4).

$$Li_{3-3\delta}Y_{1+\delta}Br_6 \qquad \text{Formula (A4)}$$

where, in the composition formula (A4), $0<\delta\leq0.25$ is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A5).

$$Li_{3-3\delta+a}Y_{1+\delta-a}Me_aCl_{6-x-y}Br_xI_y \qquad \text{Formula (A5)}$$

where, in the composition formula (A5), Me is at least one selected from the group consisting of Mg, Ca, Sr, Ba, and Zn.

In addition, in the composition formula (A5),
$-1<\delta<2$;
$0<a<3$;
$0<(3-3\delta+a)$;
$0<(1+\delta-a)$;
$0\leq x\leq 6$;
$0\leq y\leq 6$; and
$(x+y)\leq 6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A6).

$$Li_{3-3\delta}Y_{1+\delta-a}Me_aCl_{6-x-y}Br_xI_y \qquad \text{Formula (A6)}$$

where, in the composition formula (A6), Me is at least one selected from the group consisting of Al, Sc, Ga, and Bi.

In the composition formula (A6),
$-1<\delta<1$;
$0<a<2$;
$0<(1+\delta-a)$;
$0\leq x\leq 6$;
$0\leq y\leq 6$; and
$(x+y)\leq 6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A7).

$$Li_{3-3\delta-a}Y_{1+\delta-a}Me_aCl_{6-x-y}Br_xI_y \qquad \text{Formula (A7)}$$

where, in the composition formula (A7), Me is at least one selected from the group consisting of Zr, Hf, and Ti.

In the composition formula (A7),
$-1<\delta<1$;
$0<a<1.5$;
$0<(3-3\delta-a)$;
$0<(1+\delta-a)$;
$0\leq x\leq 6$;
$0\leq y\leq 6$; and
$(x+y)\leq 6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A8).

$$Li_{3-3\delta-2a}Y_{1+\delta-a}Me_aCl_{6-x-y}Br_xI_y \qquad \text{Formula (A8)}$$

where, in the composition formula (A8), Me is at least one selected from the group consisting of Ta and Nb.

In the composition formula (A8),
$-1<\delta<1$;
$0<a<1.2$;
$0<(3-3\delta-2a)$;
$0<(1+\delta-a)$;
$0\leq x\leq 6$;
$0\leq y\leq 6$; and
$(x+y)\leq 6$ are satisfied.

According to the above configuration, the ionic conductivity of the first solid electrolyte material can be further improved. Thereby, the charge/discharge efficiency of the battery can be further improved.

As the first solid electrolyte material, for example, $Li_3YX_6$, $Li_2MgX_4$, $Li_2FeX_4$, $Li(Al, Ga, In)X_4$, or $Li_3(Al, Ga, In)X_6$ can be used.

The sulfide solid electrolyte may contain lithium sulfide and phosphorus sulfide.

According to the above configuration, the charge/discharge characteristic of the battery can be further improved.

The sulfide solid electrolyte may be $Li_2S$—$P_2S_5$.

According to the above configuration, the charge/discharge characteristic of the battery can be further improved.

As the sulfide solid electrolyte, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ can be used. In addition, LiX (X: F, Cl, Br, I), $Li_2O$, $MO_q$, or $Li_pMO_q$ (M: any of P, Si, Ge, B, Al, Ga, In, Fe, Zn) (p, q: natural number) may be added thereto.

The negative electrode active material includes a material having a property of storing and releasing metal ions (for example, lithium ions).

A metal material, a carbon material, an oxide, a nitride, a tin compound, or a silicon compound can be used as the negative electrode active material. The metal material may be a single metal. Alternatively, the metal material may be an alloy. Examples of the metal material include lithium metal and lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound can be preferably used.

The negative electrode active material may include graphite.

According to the above configuration, the charge/discharge characteristic of the battery can be further improved.

As shown in FIG. 1, the negative electrode 103 may include negative electrode active material particles 104 and sulfide solid electrolyte particles 105.

The shape of each of the sulfide solid electrolyte particles 105 is not limited, and may be, for example, an acicular shape, a spherical shape, or an elliptical spherical shape. For example, the shape of each of the sulfide solid electrolyte particles 105 may be particulate.

The median diameter of the negative electrode active material particles 104 may be not less than 0.1 μm and not more than 100 μm. If the median diameter of the negative electrode active material particles 104 is less than 0.1 μm, the negative electrode active material particles 104 and the sulfide solid electrolyte particles 105 are not well dispersed in the negative electrode, so that the charge/discharge characteristic of the battery may be lowered. In addition, if the median diameter of the negative electrode active material particles 104 is more than 100 μm, lithium diffusion in the negative electrode active material particles 104 is made slow. As a result, it may be difficult to operate the battery at a high output.

The median diameter of the negative electrode active material particles 104 may be larger than the median diameter of the sulfide solid electrolyte particles 105. Thereby, the negative electrode active material particles 104 and the sulfide solid electrolyte particles 105 can be well dispersed.

In the negative electrode 103, a volume ratio Vn representing a volume of the negative electrode active material particles 104 to the total volume of the negative electrode active material particles 104 and the sulfide solid electrolyte particles 105 may be not less than 0.3 and not more than 0.95. If the volume ratio Vn is less than 0.3, it may be difficult to ensure an energy density of the battery sufficiently. On the other hand, if the volume ratio Vn is more than 0.95, it is difficult to operate the battery at a high output.

The thickness of the negative electrode 103 may be not less than 10 μm and not more than 500 μm. If the thickness of the negative electrode 103 is less than 10 μm, it may be difficult to ensure an energy density of the battery sufficiently. In addition, if the thickness of the negative electrode 103 is more than 500 μm, it may be difficult to operate at high output.

The positive electrode 101 includes a material having a property of storing and releasing metal ions (for example, lithium ions). The positive electrode 101 may include, for example, a positive electrode active material.

Examples of the positive electrode active material include:
lithium-containing transition metal oxides (for example, $Li(NiCoAl)O_2$, $Li(NiCoMn)O_2$, or $LiCoO_2$),
transition metal fluorides,
polyanion materials,
fluorinated polyanion materials,
transition metal sulfides,
transition metal oxysulfides, and
transition metal oxynitrides.

In particular, if a lithium-containing transition metal oxide is used as the positive electrode active material, the cost reduction is performed and an average discharge voltage can be raised.

The positive electrode 101 may include a solid electrolyte. According to the above configuration, the lithium ion conductivity inside the positive electrode 101 is increased to allow the operation at a high output.

The solid electrolyte material may include a halide solid electrolyte, a sulfide solid electrolyte, an oxide solid electrolyte, a polymer solid electrolyte, or a complex hydride solid electrolyte.

As the halide solid electrolyte, for example, materials exemplified as the first solid electrolyte material included in the electrolyte layer 111 described above may be used.

As the sulfide solid electrolyte, for example, materials exemplified as the sulfide solid electrolyte included in the negative electrode 103 described above may be used.

Examples of the oxide solid electrolyte include:
a NASICON solid electrolyte such as $LiTi_2(PO_4)_3$ and its element substitution product;
a perovskite solid electrolyte such as $(LaLi)TiO_3$;
a LISICON solid electrolyte such as $Li_{14}ZnGe_4O_{16}$, $Li_4SiO_4$, or $LiGeO_4$ and its element substitution product;
a garnet solid electrolyte such as $Li_7La_3Zr_2O_{12}$ and its element substitution product;
$Li_3N$ and its H substitution product,
$Li_3PO_4$ and its N substitution product;
glass to which $Li_2SO_4$ or $Li_2CO_3$ has been added using a Li—B—O compound such as $LiBO_2$ or $Li_3BO_3$ as the base thereof; and glass ceramics.

As the polymer solid electrolyte, for example, a compound of a polymer compound and a lithium salt can be used. The polymer compound may have an ethylene oxide structure. Since the solid polymer electrolyte having an ethylene oxide structure can include a large amount of lithium salt, the ionic conductivity can be further increased. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt.

As the complex hydride solid electrolyte, for example, $LiBH_4$—LiI or $LiBH_4$—$P_2S_5$ can be used.

The median diameter of the positive electrode active material particles may be not less than 0.1 μm and not more than 100 μm. If the median diameter of the positive electrode active material particles is less than 0.1 μm, the positive electrode active material particles and the solid electrolyte material are not well dispersed in the positive electrode 101, and thus the charge/discharge characteristic of the battery may be lowered. In addition, if the median diameter of the positive electrode active material particles is larger than 100 μm, lithium diffusion in the positive electrode active material particles is made slow. As a result, it may be difficult to operate the battery at a high output.

The median diameter of the positive electrode active material particles may be larger than the median diameter of the solid electrolyte material. Thereby, a good dispersion state of the positive electrode active material particle and the solid electrolyte material can be formed.

In the positive electrode 101, a volume ratio Vp representing a volume of the positive electrode active material particles to the total volume of the positive electrode active material particles and the solid electrolyte material may be not less than 0.3 and not more than 0.95. If the volume ratio Vp is less than 0.3, it may be difficult to ensure an energy density of the battery sufficiently. On the other hand, if the volume ratio Vp is more than 0.95, it may be difficult to operate the battery at a high output.

The thickness of the positive electrode 101 may be not less than 10 μm and not more than 500 μm. If the thickness of the positive electrode 101 is less than 10 μm, it may be difficult to ensure an energy density of the battery sufficiently. In addition, if the thickness of the positive electrode 101 is more than 500 μm, it may be difficult to operate at a high output.

The electrolyte layer 111 may include a sulfide solid electrolyte, an oxide solid electrolyte, a polymer solid electrolyte, and a complex hydride solid electrolyte for the purpose of increasing ion conductivity.

As the sulfide solid electrolyte, for example, materials exemplified as the electrolyte layer 111 may be used.

As the oxide solid electrolyte, for example, materials exemplified as the positive electrode 101 may be used.

As the polymer solid electrolyte, for example, materials exemplified as the positive electrode 101 may be used.

As the complex hydride solid electrolyte, for example, materials exemplified as the positive electrode 101 may be used.

The positive electrode active material may be coated. As the coating material, a material having low electron conductivity can be used. As the coating material, an oxide material or an oxide solid electrolyte can be used.

As the oxide material, for example, $SiO_2$, $Al_2O_3$, $TiO_2$, $B_2O_3$, $Nb_2O_5$, $WO_3$, or $ZrO_2$ can be used.

Examples of the oxide solid electrolyte include:
Li—Nb—O compounds such as $LiNbO_3$;
Li—B—O compounds such as $LiBO_2$ and $Li_3BO_3$;
Li—Al—O compounds such as $LiAlO_2$;
Li—Si—O compounds such as $Li_4SiO_4$;
$Li_2SO_4$;
Li—Ti—O compounds such as $Li_4Ti_5O_{12}$;
Li—Zr—O compounds such as $Li_2ZrO_3$;
Li—Mo—O compounds such as $Li_2MoO_3$;
Li-V-O compounds such as $LiV_2O_5$; and
Li—W—O compounds such as $Li_2WO_4$.

The oxide solid electrolyte has high ionic conductivity and high high-potential stability. Therefore, the charging/discharging efficiency can be further improved by using the oxide solid electrolyte.

The electrolyte layer 111 may contain the first solid electrolyte material as a main component. In other words, the electrolyte layer 111 may include the first solid electrolyte material, for example, at a weight ratio of not less than 50% (not less than 50% by weight or more) with respect to the entire electrolyte layer 111.

According to the above configuration, the charge/discharge characteristic of the battery can be further improved.

In addition, the electrolyte layer 111 may include, for example, the first solid electrolyte material at a weight ratio of not less than 70% (not less than 70% by weight) with respect to the entire electrolyte layer 111.

According to the above configuration, the charge/discharge characteristic of the battery can be further improved.

The electrolyte layer 111 may further contain inevitable impurities. The electrolyte layer 111 may include the starting materials used for the synthesis of the solid electrolyte material. The electrolyte layer 111 may include by-products or decomposition products generated when the solid electrolyte material is synthesized.

The weight ratio of the solid electrolyte material included in the electrolyte layer 111 to the electrolyte layer 111 may be substantially 1. "The weight ratio is substantially 1" means that the weight ratio calculated without considering the inevitable impurities that may be included in the electrolyte layer 111 is 1. In other words, the electrolyte layer 111 may be composed only of the solid electrolyte material.

According to the above configuration, the charge/discharge characteristic of the battery can be further improved.

As described above, the electrolyte layer 111 may be composed only of the first solid electrolyte material.

The electrolyte layer 111 may include two or more kinds of the materials described as the first solid electrolyte material. For example, the electrolyte layer 111 may include the first solid electrolyte material and the sulfide solid electrolyte material.

The thickness of the electrolyte layer 111 may be not less than 1 μm and not more than 300 μm. If the thickness of the electrolyte layer 111 is less than 1 μm, the possibility that the positive electrode 101 and the negative electrode 103 are short-circuited increases. In addition, if the thickness of the electrolyte layer 111 is more than 300 μm, it may be difficult to operate at a high output.

At least one of the positive electrode 101, the electrolyte layer 111, and the negative electrode 103 may include a binder for the purpose of improving adhesion between the particles. The binder is used in order to improve the binding property of the material which forms the electrode.

An example of the material of the binder is poly(vinylidene fluoride), polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, or carboxymethylcellulose.

As the binder, a copolymer of two or more kinds of materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene can be used.

In addition, two or more kinds selected from these may be mixed and used as the binder.

At least one of the positive electrode 101 and the negative electrode 103 may include a conductive agent for the purpose of increasing the electronic conductivity. Examples of the conductive agent include:
graphite such as natural graphite or artificial graphite;
carbon black such as acetylene black or ketjen black;
a conductive fiber such as a carbon fiber or a metal fiber;
carbon fluoride;
metal powder such as aluminum;
conductive whiskers such as zinc oxide or potassium titanate;

a conductive metal oxide such as titanium oxide; and a conductive polymer compound such as polyaniline, polypyrrole, or polythiophene.

Cost reduction can be achieved by using a carbon conductive agent as the conductive agent.

The battery in the first embodiment can be configured as a battery having various shapes such as a coin shape, a cylindrical shape, a prism shape, a sheet shape, a button shape, a flat shape, or a stacked shape.

(Manufacturing Method of First Solid Electrolyte Material)

The first solid electrolyte material in the first embodiment may be manufactured by the following method, for example.

In consideration of the composition ratio of the product, binary halide raw material powders are prepared. For example, if $Li_3YCl_6$ is produced, LiCl and $YCl_3$ are prepared at a molar ratio of 3:1.

At this time, by selecting the kinds of raw material powders, the elements "M", "Me", and "X" in the above-described composition formula can be determined. In addition, by adjusting the raw material powders, the blending ratio, and the synthesis process, the values of "α", "β", "γ", "d", "δ", "a", "x", and "y" are determined.

Raw material powders are mixed well. Next, the raw material powders are ground using a mechanochemical milling processing method. In this way, the raw material powders react to provide the first solid electrolyte material. Alternatively, the raw material powders are mixed well, and then, sintered in vacuum to provide the first solid electrolyte material.

Thereby, the above-mentioned solid electrolyte material including a crystal phase is provided.

The configuration of the crystal phase (namely, the crystal structure) in a solid electrolyte material can be determined by selecting the reaction method and reaction conditions of the raw material powders.

Second Embodiment

Hereinafter, the second embodiment will be described. The description which has been set forth in the above-described first embodiment is omitted as appropriate.

Figure 2:
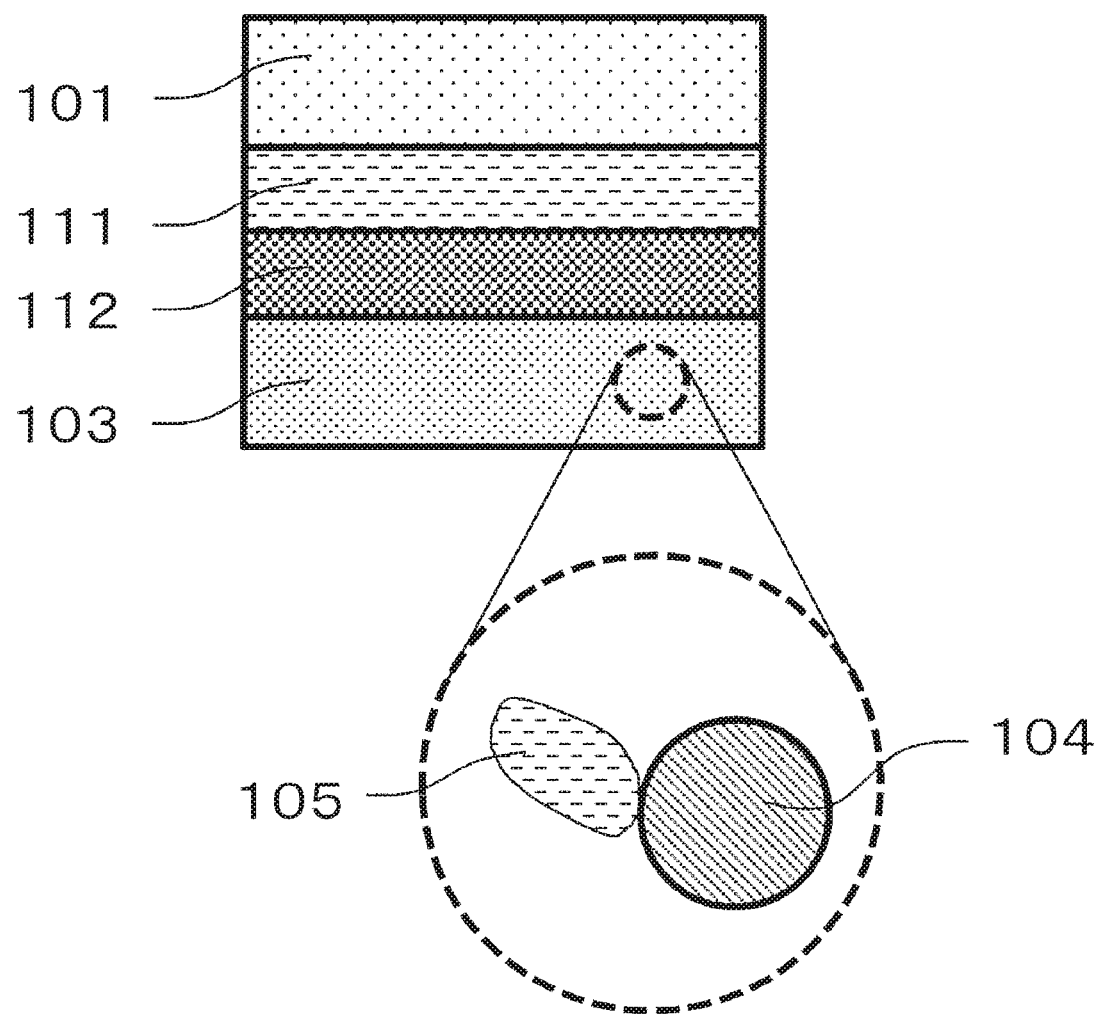
FIG. 2 shows a cross-sectional view of a battery 2000 in a second embodiment.

FIG. 2 is a cross-sectional view showing a schematic configuration of a battery 2000 in the second embodiment.

The battery 2000 in the second embodiment further comprises the following configuration in addition to the configuration of the battery 1000 in the first embodiment described above.

In other words, the battery 2000 in the second embodiment further comprises a second electrolyte layer 112.

The second electrolyte layer 112 is provided between the negative electrode 103 and the electrolyte layer 111.

The second electrolyte layer 112 includes a second sulfide solid electrolyte.

According to the above structure, the charging/discharging efficiency of a battery can be improved.

When the sulfide solid electrolyte and the positive electrode active material are brought into contact with each other, a resistance layer referred to as a space charge layer is formed at the interface between the positive electrode active material and the sulfide solid electrolyte. On the other hand, the halide solid electrolyte does not form a resistance layer, even when the halide solid electrolyte is brought into contact with the positive electrode active material. For this reason, the formation of the resistance layer in the second electrolyte layer 112 is suppressed by providing the second electrolyte layer 112 between the negative electrode 103 and the electrolyte layer 111. As a result, the charge/discharge efficiency can be improved.

As the second sulfide solid electrolyte, the material described as the sulfide solid electrolyte in the first embodiment described above can be used.

The second sulfide solid electrolyte may contain lithium sulfide and phosphorus sulfide.

According to the above configuration, the charge/discharge characteristic of the battery can be further improved.

The second sulfide solid electrolyte may be $Li_2S$—$P_2S_5$.

According to the above configuration, the charge/discharge characteristic of the battery can be further improved.

The sulfide solid electrolyte and the second sulfide solid electrolyte included in the negative electrode 103 may be formed of different materials from each other.

Alternatively, the sulfide solid electrolyte and the second sulfide solid electrolyte included in the negative electrode 103 may be the same material as each other.

According to the above configuration, the charge/discharge characteristic of the battery can be further improved.

The second electrolyte layer 112 may include the second sulfide solid electrolyte as a main component. In other words, the second electrolyte layer 112 may include the second sulfide solid electrolyte, for example, at a weight ratio of not less than 50% (not less than 50% by weight) with respect to the entire second electrolyte layer 112.

According to the above configuration, the charge/discharge characteristic of the battery can be further improved.

Further, the second electrolyte layer 112 may include the second sulfide solid electrolyte, for example, at a weight ratio of not less than 70% (not less than 70% by weight) with respect to the entire second electrolyte layer 112.

According to the above configuration, the charge/discharge characteristic of the battery can be further improved.

The second electrolyte layer 112 may further contain inevitable impurities. The second electrolyte layer 112 may include the starting materials used for the synthesis of the second sulfide solid electrolyte. The second electrolyte layer 112 may include by-products or decomposition products generated when the second sulfide solid electrolyte is synthesized.

The weight ratio of the second sulfide solid electrolyte contained in the second electrolyte layer 112 to the second electrolyte layer 112 may be substantially 1. "The weight ratio is substantially 1" means that the weight ratio calculated without considering inevitable impurities that may be included in the second electrolyte layer 112 is 1. In other words, the second electrolyte layer 112 may be composed only of the second sulfide solid electrolyte.

According to the above configuration, the charge/discharge characteristic of the battery can be further improved.

As described above, the second electrolyte layer 112 may be composed only of the second sulfide solid electrolyte.

The second electrolyte layer 112 may further include the electrolyte material described in the above-described first embodiment together with the second sulfide solid electrolyte.

The total thickness of the electrolyte layer 111 and the second electrolyte layer 112 may be not less than 1 μm and not more than 300 μm. If the total thickness of the electrolyte layer 111 and the second electrolyte layer 112 is less than 1 μm, the possibility that the positive electrode 101 and the negative electrode 103 are short-circuited increases. In addition, if the total thickness of the electrolyte layer 111 and the second electrolyte layer 112 is more than 300 μm, it may be difficult to operate at a high output.

EXAMPLES

Hereinafter, details of the present disclosure will be described with reference to inventive examples and comparative examples.

Inventive Example 1

[Production of First Solid Electrolyte Material]

In an argon glove box with a dew point of −60° C. or less, raw material powders LiCl and YCl$_3$ were prepared at a molar ratio of LiCl:YCl$_3$=3:2. Subsequently, milling processing was performed at 600 rpm for 25 hours using a planetary ball mill (manufactured by Fritsch, type P-7) to provide a powder of the first solid electrolyte material Li$_3$YCl$_6$ according to the inventive example 1.

[Production of Sulfide Solid Electrolyte Material]

In an argon glove box with a dew point of −60° C. or less, Li$_2$S and P$_2$S$_5$ were prepared at a molar ratio of Li$_2$S:P$_2$S$_5$=75:25. These were ground and mixed in a mortar. Subsequently, a glassy solid electrolyte was provided by milling processing at 510 rpm for 10 hours using the planetary ball mill (manufactured by Fritsch, P-7 type). The glassy solid electrolyte was heat-treated at 270° C. for 2 hours in an inert atmosphere. Thus, a glass ceramic sulfide solid electrolyte material Li$_2$S—P$_2$S$_5$ according to the inventive example 1 was provided.

[Production of Positive Electrode Material]

In the argon glove box, the first solid electrolyte material Li$_3$YCl$_6$ of the inventive example 1 and Li(NiCoMn)O$_2$ (hereinafter, referred to as NCM) were prepared at a weight ratio of 30:70. By mixing these in an agate mortar, the positive electrode material of the inventive example 1 was produced.

[Production of Negative Electrode Material]

In the argon glove box, the sulfide solid electrolyte material Li$_2$S—P$_2$S$_5$ of the inventive example 1 and graphite, which was a negative electrode active material, were prepared at a weight ratio of 60:40. By mixing these in an agate mortar, the negative electrode material of the inventive example 1 was produced.

[Production of Secondary Battery]

In an insulating outer cylinder, the negative electrode material of the inventive example 1 (12 mg), the sulfide solid electrolyte material Li$_2$S—P$_2$S$_5$ of the inventive example 1 (40 mg), the first solid electrolyte material Li$_3$YCl$_6$ of the inventive example 1 (40 mg), and the positive electrode material of the inventive example 1 (10 mg) were stacked in this order. This was press-molded at a pressure of 360 MPa to produce a stacking structure composed of a positive electrode, a first electrolyte layer, a second electrolyte layer, and a negative electrode.

Next, stainless steel current collectors were placed on the upper and lower parts of the the stacking structure, and current collector leads were attached to the current collectors.

Finally, an insulating ferrule was used to block and seal the inside of the insulating outer cylinder from the outside atmosphere. In this way, a battery was produced.

Inventive Example 2

[Production of First Solid Electrolyte Material]

In an argon glove box with a dew point of −60° C. or less, raw material powders LiBr and YBr$_3$ were prepared at a molar ratio of LiBr:YBr$_3$=3:2. Subsequently, milling processing was performed at 600 rpm for 25 hours using a planetary ball mill (manufactured by Fritsch, type P-7) to provide a powder of the first solid electrolyte material Li$_3$YBr$_6$ of the inventive example 2.

A secondary battery was produced in the same manner as in the inventive example 1, except that the first solid electrolyte material of the inventive example 2 was used for the first electrolyte layer.

Inventive Example 3

[Production of First Solid Electrolyte Material]

In an argon glove box with a dew point of −60° C. or less, raw material powders LiCl, YCl$_3$, and ZrCl$_4$ were prepared at a molar ratio of LiCl:YCl$_3$:ZrCl$_4$=2.5:0.5:0.5. Subsequently, milling processing was performed at 600 rpm for 25 hours using a planetary ball mill (manufactured by Fritsch, type P-7) to provide a powder of the first solid electrolyte material Li$_{2.5}$Y$_{0.5}$Zr$_{0.5}$Cl$_6$ of the inventive example 3.

A secondary battery was produced in the same manner as in the inventive example 1, except that the first solid electrolyte material of the inventive example 3 was used for the first electrolyte layer.

Comparative Example 1

[Production of Negative Electrode Material]

In the argon glove box, the first solid electrolyte material Li$_3$YCl$_6$ of the inventive example 1 and graphite, which was a negative electrode active material, were prepared at a weight ratio of 60:40. By mixing these in an agate mortar, the negative electrode material of the comparative example 1 was produced.

[Production of Secondary Battery]

A secondary battery according to the comparative example 1 was produced as follows, using the first solid electrolyte material Li$_3$YCl$_6$ of the inventive example 1, the positive electrode material of the inventive example 1, and the negative electrode material of the comparative example 1.

In an insulating outer cylinder, the negative electrode material of the comparative example 1 (12 mg), the first solid electrolyte material Li$_3$YCl$_6$ of the inventive example 1 (80 mg), and the positive electrode material of the inventive example 1 (10 mg) were stacked in this order. This was press-molded at a pressure of 360 MPa to produce a stacking structure composed of a positive electrode, an electrolyte layer, and a negative electrode.

Next, stainless steel current collectors were placed on the upper and lower parts of the stacking structure, and current collector leads were attached to the current collectors.

Finally, an insulating ferrule was used to block and seal the inside of the insulating outer cylinder from the outside atmosphere. In this way, the battery of the comparative example 1 was produced.

[Charge/Discharge Test]

Using each of the batteries of the inventive examples 1 to 3 and the comparative example 1, a charge/discharge test was performed under the following conditions.

The battery was placed in a thermostatic chamber at 25° C.

The battery was constant-current charged at a current value of 70 μA, which was 0.05 C rate (20 hour rate) with respect to the theoretical capacity of the battery, and the charge was terminated at a voltage of 4.2 V.

Next, the battery was discharged at a current value of 70 μA, which was 0.05 C rate, and the discharge was terminated at a voltage of 2.5 V.

As above, the initial charge/discharge efficiency (=initial discharge capacity/initial charge capacity) of each of the batteries of the inventive examples 1 to 3 and the comparative example 1 was provided. The results are shown in Table 1 below.

TABLE 1

| | Electrolyte layer First solid electrolyte material | Second electrolyte layer Second sulfide solid electrolyte material | Negative electrode layer | | Charge/ discharge efficiency (%) |
|---|---|---|---|---|---|
| | | | Negative electrode active material | Sulfide solid electrolyte | |
| Inventive Example 1 | $Li_3YCl_6$ | $Li_2S-P_2S_5$ | Graphite | $Li_2S-P_2S_5$ | 92.4 |
| Inventive Example 2 | $Li_3YBr_6$ | $Li_2S-P_2S_5$ | Graphite | $Li_2S-P_2S_5$ | 91.5 |
| Inventive Example 3 | $Li_{2.5}Y_{0.5}Zr_{0.5}Cl_6$ | $Li_2S-P_2S_5$ | Graphite | $Li_2S-P_2S_5$ | 93.5 |
| Comparative Example 1 | $Li_3YCl_6$ | $Li_3YCl_6$ | Graphite | $Li_3YCl_6$ | 63.9 |

(Discussion)

Figure 3:
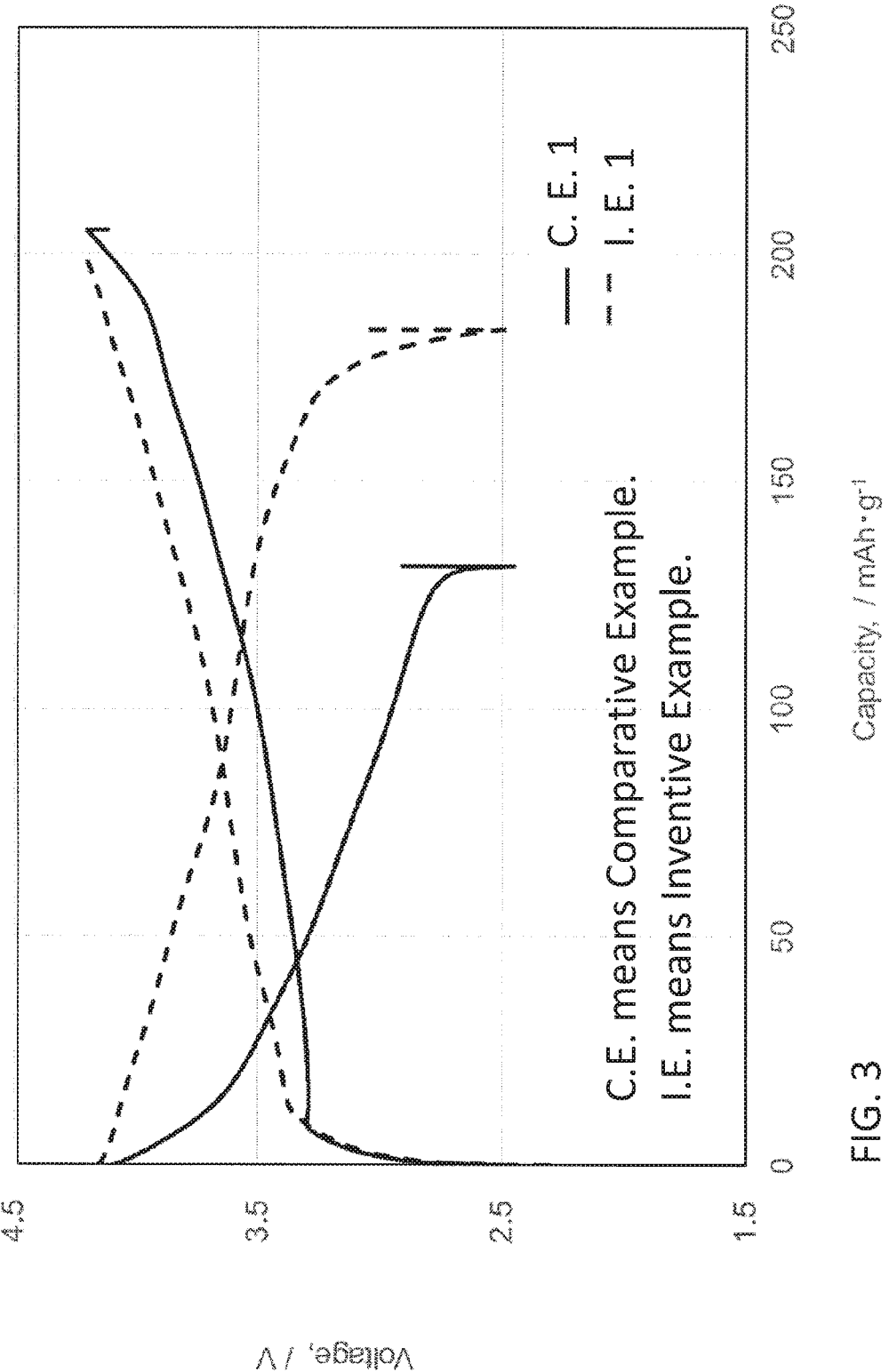
FIG. 3 is a graph showing an initial charge/discharge characteristic of the batteries in the inventive example 1 and the comparative example 1.

FIG. 3 is a graph showing the initial charge/discharge characteristic of the batteries in the inventive example 1 and the comparative example 1.

From the results of the inventive example 1 and the comparative example 1 shown in FIG. 3 and Table 1, it was confirmed that, by inserting an electrochemically stable sulfide solid electrolyte between the first solid electrolyte material and the negative electrode, and thereby covering the periphery of the negative electrode active material with the sulfide solid electrolyte, the contact between the first solid electrolyte material which was the halide solid electrolyte and the negative electrode active material was suppressed to improve the charge/discharge efficiency.

From the results of the inventive examples 1 to 3 and the comparative example 1 shown in Table 1, a similar effect was confirmed also in the halide solid electrolytes other than $Li_3YCl_6$.

Inventive Example 4

[Production of First Solid Electrolyte Material]

In an argon glove box with a dew point of −60° C. or less, raw material powders LiCl, $YCl_3$, and $ZrCl_4$ were prepared at a molar ratio of LiCl:$YCl_3$:$ZrCl_4$=2.5:0.5:0.5. Subsequently, milling processing was performed at 600 rpm for 25 hours using a planetary ball mill (manufactured by Fritsch, type P-7) to provide a powder of the first solid electrolyte material $Li_{2.5}Y_{0.5}Zr_{0.5}Cl_6$ of the inventive example 4.

[Production of Sulfide Solid Electrolyte Material]

In an argon glove box with a dew point of −60° C. or lower, $Li_2S$ and $P_2S_5$ were prepared at a molar ratio was $Li_2S$:$P_2S_5$=75:25. These were ground and mixed in a mortar. Subsequently, a glassy solid electrolyte was provided by milling processing at 510 rpm for 10 hours using a planetary ball mill (Fritsch P-7). The glassy solid electrolyte was heat-treated at 270 degrees Celsius for 2 hours in an inert atmosphere. As a result, the glass-ceramic sulfide solid electrolyte material $Li_2S-P_2S_5$ of the inventive example 4 was provided.

[Production of Positive Electrode Material]

In the argon glove box, the first solid electrolyte material $Li_{2.5}Y_{0.5}Zr_{0.5}Cl_6$ of the inventive example 4 and Li(Ni-CoMn)$O_2$ (hereinafter, referred to as NCM) were prepared at a weight ratio of 30:70. By mixing these in an agate mortar, the positive electrode material of the inventive example 4 was produced.

[Production of Negative Electrode Material]

In the argon glove box, the sulfide solid electrolyte material $Li_2S-P_2S_5$ of the inventive example 4 and graphite, which was a negative electrode active material, were prepared at a weight ratio of 60:40. By mixing these in an agate mortar, the negative electrode material of the inventive example 4 was produced.

[Production of Secondary Battery]

In an insulating outer cylinder, the negative electrode material of the inventive example 4 (12 mg), the first solid electrolyte material $Li_{2.5}Y_{0.5}Zr_{0.5}Cl_6$ of the inventive example 4 (80 mg), and the positive electrode material of the inventive example 4 (10 mg) were stacked in this order. This was pressure-molded at a pressure of 360 MPa to produce a stacking structure composed of a positive electrode, an electrolyte layer, and a negative electrode.

Next, stainless steel current collectors were placed on the upper and lower parts of the stacking structure, and current collector leads were attached to the current collectors.

Finally, an insulating ferrule was used to block and seal the inside of the insulating outer cylinder from the outside atmosphere. In this way, a battery was produced.

Inventive Example 5

[Production of First Solid Electrolyte Material]

In an argon glove box with a dew point of −60° C. or less, raw material powders LiCl and $YCl_3$ were prepared at a molar ratio of LiCl:$YCl_3$=3:2. Subsequently, milling process was performed at 600 rpm for 25 hours using a planetary ball mill (Fritsch, P-7 type) to provide a powder of the first solid electrolyte material $Li_3YCl_6$.

A secondary battery was produced in the same manner as in the inventive example 4, except that the first solid electrolyte material of the inventive example 5 was used for the electrolyte layer.

Inventive Example 6

[Production of First Solid Electrolyte Material]

In an argon glove box with a dew point of −60° C. or less, raw material powders LiBr and $YBr_3$ were prepared at a molar ratio of LiBr:$YBr_3$=3:2. Subsequently, milling processing was performed at 600 rpm for 25 hours using a planetary ball mill (Fritsch, P-7 type) to provide a powder of the first solid electrolyte material $Li_3YBr_6$.

A secondary battery was produced in the same manner as in the inventive example 4, except that the first solid electrolyte material of the inventive example 6 was used for the electrolyte layer.

Comparative Example 2

[Production of Negative Electrode Material]

In an argon glove box, the first solid electrolyte material $Li_{2.5}Y_{0.5}Zr_{0.5}Cl_6$ of the inventive example 4 and graphite, which was a negative electrode active material, were prepared at a weight ratio of 60:40. By mixing these in an agate mortar, the negative electrode material of the comparative example 2 was produced.

[Production of Secondary Battery]

The battery according to the comparative example 2 was produced as below, using the first solid electrolyte material $Li_{2.5}Y_{0.5}Zr_{0.5}Cl_6$ of the inventive example 4, the positive electrode material of the inventive example 4, and the negative electrode material of the comparative example 2.

In an insulating outer cylinder, the negative electrode material of the inventive example 4 (12 mg), the first solid electrolyte material $Li_{2.5}Y_{0.5}Zr_{0.5}Cl_6$ of the inventive example 4 (80 mg), and the positive electrode material of the inventive example 4 (10 mg) were stacked in this order. This was press-molded at a pressure of 360 MPa to produce a stacking structure composed of a positive electrode, an electrolyte layer, and a negative electrode.

Next, stainless steel current collectors were placed on the upper and lower parts of the stacking structure, and current collector leads were attached to the current collectors.

Finally, an insulating ferrule was used to block and seal the inside of the insulating outer cylinder from the outside atmosphere. In this way, the battery of the comparative example 2 was produced.

[Charge/Discharge Test]

Using each of the batteries of the inventive examples 4 to 6 and the comparative example 2 described above, a charge test was performed under the following conditions.

The battery was placed in a thermostatic chamber at 25° C.

The battery was constant-current charged at a current value of 70 μA, which was 0.05 C rate (20 hour rate) with respect to the theoretical capacity of the battery, and the charge was terminated at a voltage of 4.2 V.

For the charged battery, an AC impedance test was performed under the following conditions.

Reference voltage: Open circuit voltage
Voltage amplitude: 10 mV
Frequency: 100 kHz-0.01 Hz Thus, the interface resistance of each of the batteries of the inventive examples 4 to 6 and the comparative example 2 was provided. The results are shown in Table 2 below.

confirmed that, by covering the periphery of the negative electrode active material with a sulfide solid electrolyte, the contact of the first solid electrolyte material that was a halide solid electrolyte and the negative electrode active material was suppressed and that the interface resistance between the negative electrode and the solid electrolyte was decreased.

From the results of the inventive examples 4 to 6 and the comparative example 2 shown in Table 2, a similar effect was confirmed in the halide solid electrolytes other than $Li_{2.5}Y_{0.5}Zr_{0.5}Cl_6$.

INDUSTRIAL APPLICABILITY

The battery of the present disclosure can be used as, for example, an all solid lithium secondary battery.

REFERENTIAL SIGNS LIST

1000, 2000 Battery
101 Positive electrode
111 Electrolyte layer
112 Second electrolyte layer
103 Negative electrode
104 Negative electrode active material particle
105 Sulfide solid electrolyte particle

The invention claimed is:

1. A battery, comprising:
a positive electrode;
a negative electrode; and
an electrolyte layer provided between the positive electrode and the negative electrode, wherein:
the first electrolyte layer includes a first solid electrolyte material,
the first solid electrolyte material is a compound represented by $Li_aMe_bY_cX_6$, where $$a+mb+3c=6, a\leq 0 \text{ and } c\leq 0$$

are satisfied, m is a valence of Me, and Me includes at least one selected from the group consisting of Mg, Ca, Sr, Ba, Zn, Sc, Al, Ga, Bi, Zr, Hf, Ti, Sn, Ta, and Nb,
X is at least one selected from the group consisting of Cl, Br, and I, and
the negative electrode includes negative electrode active material particles and particles of a first sulfide solid electrolyte comprising lithium sulfide and phosphorus sulfide, which are in contact with each other.

TABLE 2

|  | Electrolyte layer First solid electrolyte material | Negative electrode layer | | Interface resistance (Ω) |
| --- | --- | --- | --- | --- |
|  |  | Negative electrode active material | Sulfide solid electrolyte |  |
| Inventive Example 4 | $Li_{2.5}Y_{0.5}Zr_{0.5}Cl_6$ | Graphite | $Li_2S$—$P_2S_5$ | 628.0 |
| Inventive Example 5 | $Li_3YCl_6$ | Graphite | $Li_2S$—$P_2S_5$ | 112.5 |
| Inventive Example 6 | $Li_3YBr_6$ | Graphite | $Li_2S$—$P_2S_5$ | 113.7 |
| Comparative Example 2 | $Li_{2.5}Y_{0.5}Zr_{0.5}Cl_6$ | Graphite | $Li_{2.5}Y_{0.5}Zr_{0.5}Cl_6$ | 1176.9 |

(Discussion)

Figure 4:
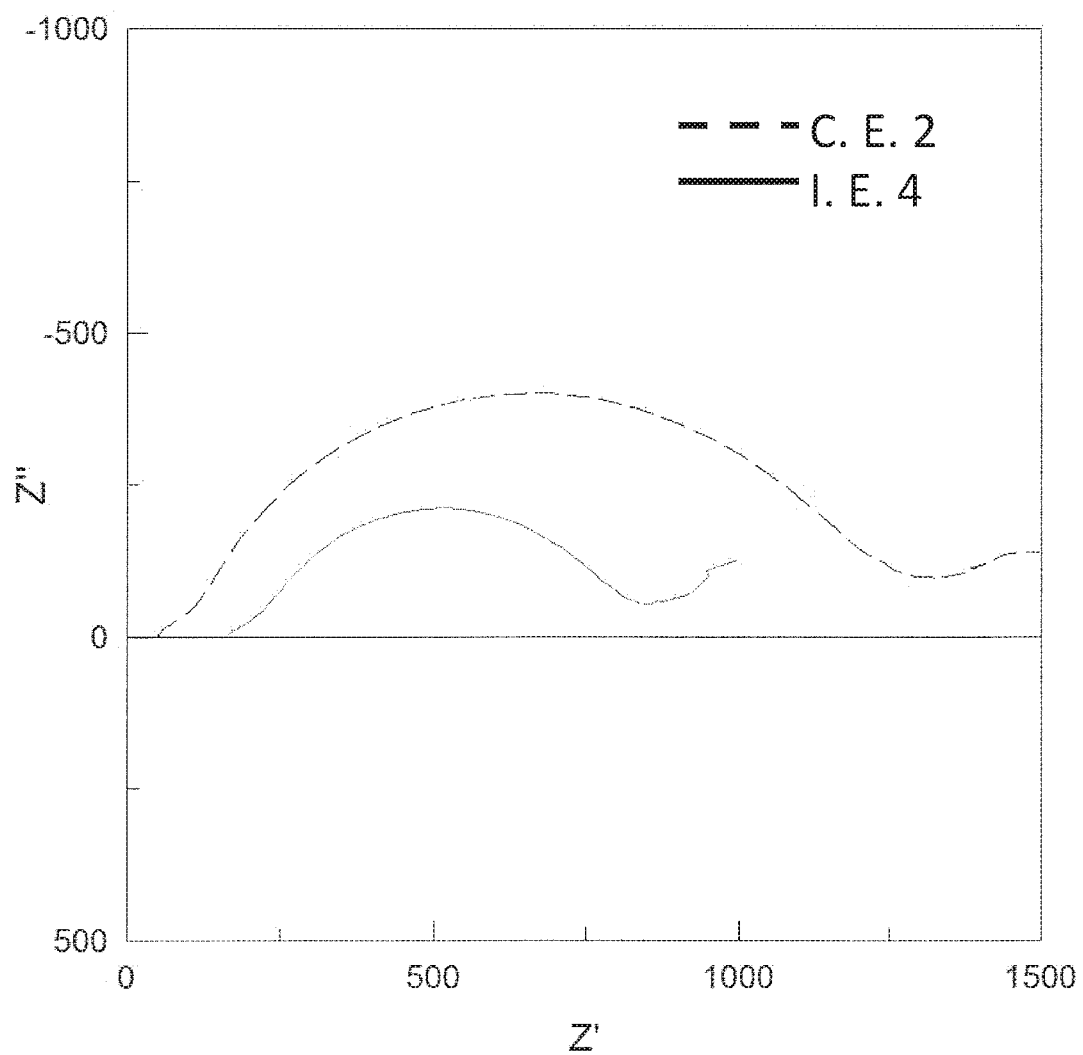
FIG. 4 is a graph showing the initial charge characteristic of the batteries in the inventive example 4 and the comparative example 2.

FIG. 4 is a graph showing the initial charge characteristic of the batteries in the inventive example 4 and the comparative example 2.

From the results of the inventive example 4 and the comparative example 2 shown in FIG. 4 and Table 2, it was 2. The battery according to claim 1, wherein
the first solid electrolyte material is at least one selected from the group consisting of $Li_{2.5}Y_{0.5}Zr_{0.5}Cl_6$, $Li_3YCl_6$, and $Li_3YBr_6$.

3. The battery according to claim 1, wherein
the sulfide solid electrolyte is $Li_2S$—$P_2S_5$.

4. The battery according to claim 1, wherein the negative electrode active material includes graphite.

5. The battery according to claim 1, further comprising:
a second electrolyte layer,
wherein
the second electrolyte layer is provided between the negative electrode and the electrolyte layer; and
the second electrolyte layer includes a second sulfide solid electrolyte comprising lithium sulfide and phosphorus sulfide, which is a same or different from the first sulfide solid electrolyte.

6. The battery according to claim 5, wherein the second sulfide solid electrolyte is $Li_2S$—$P_2S_5$.

* * * * *